(12) United States Patent
Nikitin et al.

(10) Patent No.: US 6,909,791 B2
(45) Date of Patent: Jun. 21, 2005

(54) METHOD OF MEASURING A LINE EDGE ROUGHNESS OF MICRO OBJECTS IN SCANNING MICROSCOPES

(75) Inventors: Arkady Nikitin, Ardsley, NY (US); Dmitriy Yeremin, Dobbs Ferry, NY (US)

(73) Assignee: General Phosphorix, LLC, Ardsley, NY (US)

( * ) Notice: Subject to any disclaimer, the term of this patent is extended or adjusted under 35 U.S.C. 154(b) by 630 days.

(21) Appl. No.: 10/115,375

(22) Filed: Apr. 3, 2002

(65) Prior Publication Data

US 2003/0190069 A1 Oct. 9, 2003

(51) Int. Cl.$^7$ ............................. G06K 9/00; H04N 7/18
(52) U.S. Cl. ..................... 382/108; 382/141; 382/199; 356/237.2; 250/559.36; 348/128
(58) Field of Search ................... 382/141–152, 382/108, 199, 291; 356/69, 237.2; 250/559.36; 702/34; 348/128

(56) References Cited

U.S. PATENT DOCUMENTS

| | | | |
|---|---|---|---|
| 4,750,140 A | * 6/1988 | Asano et al. | 382/108 |
| 4,792,232 A | * 12/1988 | Jobe et al. | 356/394 |
| 5,805,728 A | * 9/1998 | Munesada et al. | 382/199 |
| 6,781,688 B2 | * 8/2004 | Kren et al. | 356/237.4 |
| 2002/0097913 A1 | * 7/2002 | Ikeda | 382/199 |

* cited by examiner

Primary Examiner—Yon J. Couso
Assistant Examiner—Aaron Carter
(74) Attorney, Agent, or Firm—I. Zborovsky

(57) ABSTRACT

A line edge roughness of micro objects is determined in a microscope by corresponding scanning and determination of deviations of points of the edge from a straight line.

10 Claims, 5 Drawing Sheets

Illustration of a geometry of an experiment and a ratio between values $\Delta x(i)$ and $\Delta l(i)$.
1 is an edge of the micro object; 2 is an approximating straight line;

Flow chart of the method in accordance with the present invention.

The illustration of an orientation of object on a stage of microscope.
1 is edge of object to be measured; 2 is approximating straight line;
X is direction of scanning, which is not coincide with approximating straight line (2).

a) movement of an electron beam over an object along the direction of a scan line X in a microscope with digital scanning.
b) trajectory of movement of an electron beam over a field of view of the microscope.
1 is Microscope Field of View; 2 is Pixels.

Illustration of a geometry of an experiment and a ratio between values $\Delta x(i)$ and $\Delta l(i)$.
1 is an edge of the micro object; 2 is an approximating straight line;

Trapezoidal trench.
a) geometry; b) video signal; c) absolute value of the derivative of the video signal.
1 is an edge maximum; 2 is working slope of an edge maximum; 3 is a reference point in which absolute value of the derivative of the video signal has maximum.

METHOD OF MEASURING A LINE EDGE ROUGHNESS OF MICRO OBJECTS IN SCANNING MICROSCOPES

BACKGROUND OF THE INVENTION

The present invention relates to method of measuring a line edge roughness of micro objects in scanning microscopes. The method can be used for a quality control of very small objects by a scanning electron microscope and particularly in an in-process inspection of photoresistive and other ULSI features in the semiconductor industry.

It is important to determine a line edge roughness for such objects as elements of integral circuits or details of photoresist masks, in a scanning electron microscope. The reason is that the line edge roughness of some micro objects in particular elements of integral circuits significantly affect parameters and reliability of operation of the device as a whole. The method to roughly determine the line edge roughness of such objects by visually examining them in electron microscope is known. However, this method cannot be considered as accurate.

SUMMARY OF THE INVENTION

Accordingly, it is an object of the present invention to provide method of measuring a line edge roughness micro objects in scanning microscopes, which avoids the disadvantages of the prior art.

In keeping with these objects and with others which will become apparent hereinafter, one feature of the present invention resides, briefly stated, in a method which has the steps of orienting a micro object in a microscope so that an edge of an object to be analyzed is non parallel to a direction of a scan line which is an axis X of an image; line-by-line scanning of the object to be measured with electron beam and measuring of a dependency of a video signal S from a coordinate x along a scanning line as a function S(x) for each line; determining a coordinate of an edge $X_E$ on the function S(x) for each line to form a set of values $X_E(i)$ wherein i is a number of the line; approximation of said set of values $X_E(i)$ with a linear function and calculation of parameters A and B in an equation:

$$X(i)=A*i+B,$$

which approximates the dependence $X_E$ from the number of line (i); calculation for each scan line an individual deviation $\Delta x(i)$ of a position of an edge from a straight line along a direction of the scan line (axis X):

$$\Delta x(i)=X(i)-X_E(i);$$

wherein X(i) is an X coordinate of a point of intersection of the approximating straight line with a scan line having number (i); calculating for each line an individual deviation $\Delta l(i)$ of a position of the edge from a straight line in a perpendicular direction to the approximating straight line in accordance with the formula:

$$\Delta l(i) = \frac{\Delta x(i)}{\sqrt{A^2+1}};$$

and using the thusly obtained set of values $\Delta l(i)$ for evaluation of a line edge roughness of the micro object.

In accordance with another feature of the present invention, the method for measuring of the line edge roughness of the features with trapezoidal form cross-section which has the steps of orienting a micro object in a microscope so that an edge of an object to be analyzed is non parallel to a direction of a scan line development which is an axis X of an image; line-by-line scanning of the object to be measured with electron beam and measuring a dependency of a video signal S from a coordinate x along a scanning line as a function S(x) for each line; determining a coordinate of an edge $X_E$ on the function S(x) for each line by finding on a video signal S(x) of two pronounced maximums located on edges of an object, selecting on each maximum working slopes which adjoin a lower line of a trapezoidal cross-section so that for objects with trapezoidal ledges these are exterior slopes and for objects in form of trenches these are interior slopes, on the working slope of each left and right maximum finding reference points as points where an absolute value of a derivative of the video signal has a maximum value and considering abscissas of such reference points as coordinates of an edge of the trapezoidal object along a lower line of its cross-section; approximating a set of values of $X_E(i)$ with a linear function and calculating parameters A and B in accordance with equation:

$$X(i)=A*i+B$$

which approximates the dependence $X_E$ from a number of line (i); calculating an individual deviation $\Delta x(i)$ of a position of the edge from a straight line for each scan line along the direction of the scan line (of the axis X)

$$\Delta x(i)=X(i)-X_E(i),$$

wherein X(i) is a coordinate of a point of intersection of the approximating straight line with the scan line having the number (i); calculating of an individual deviation $\Delta l(i)$ of position of edge from a straight line for each scan line in direction of a perpendicular to the approximating straight line in accordance with the formula $$\Delta l(i) = \frac{\Delta x(i)}{\sqrt{A^2+1}};$$

and using the thusly obtained set of values $\Delta l(i)$ for evaluation of a line edge roughness of the micro object.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A method in accordance with one embodiment of the invention includes the following steps.

Figure 1:
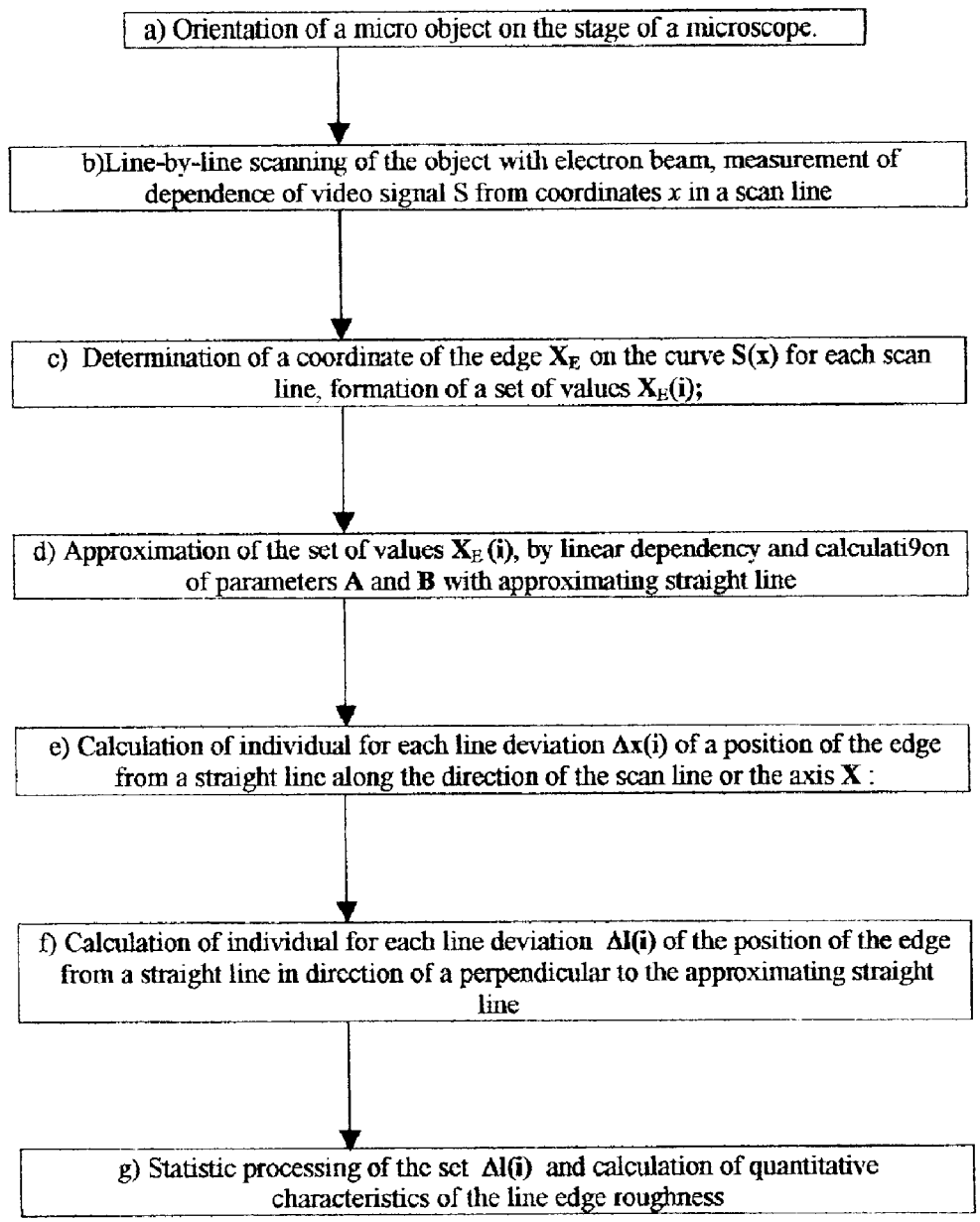
FIG. 1 is a flow chart of a method in accordance with the present invention, with steps 1a–1c performed only when a determination of a line edge roughness is performed as a separate operation; if however the calculation of a line edge roughness is performed during a process of measurements of a microsize, the steps 1a–1c are ignored, and coordinates of an edge $X_E(i)$ are taken from data obtained during measurement of the sizes.
Figure 2:
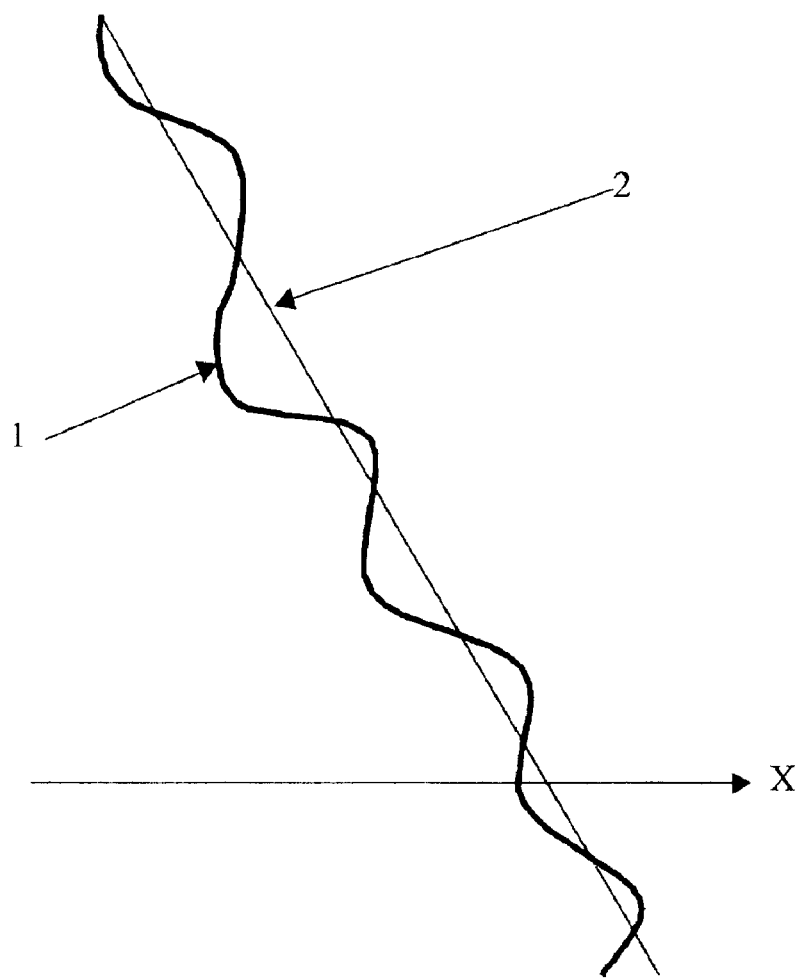
FIG. 2 illustrates an orientation of object on a stage of microscope with a direction of a scan line in accordance with an axis X, wherein an orientation of an edge of an object is not parallel to the direction X, and the most convenient is an orientation perpendicular to X.
Figure 3:
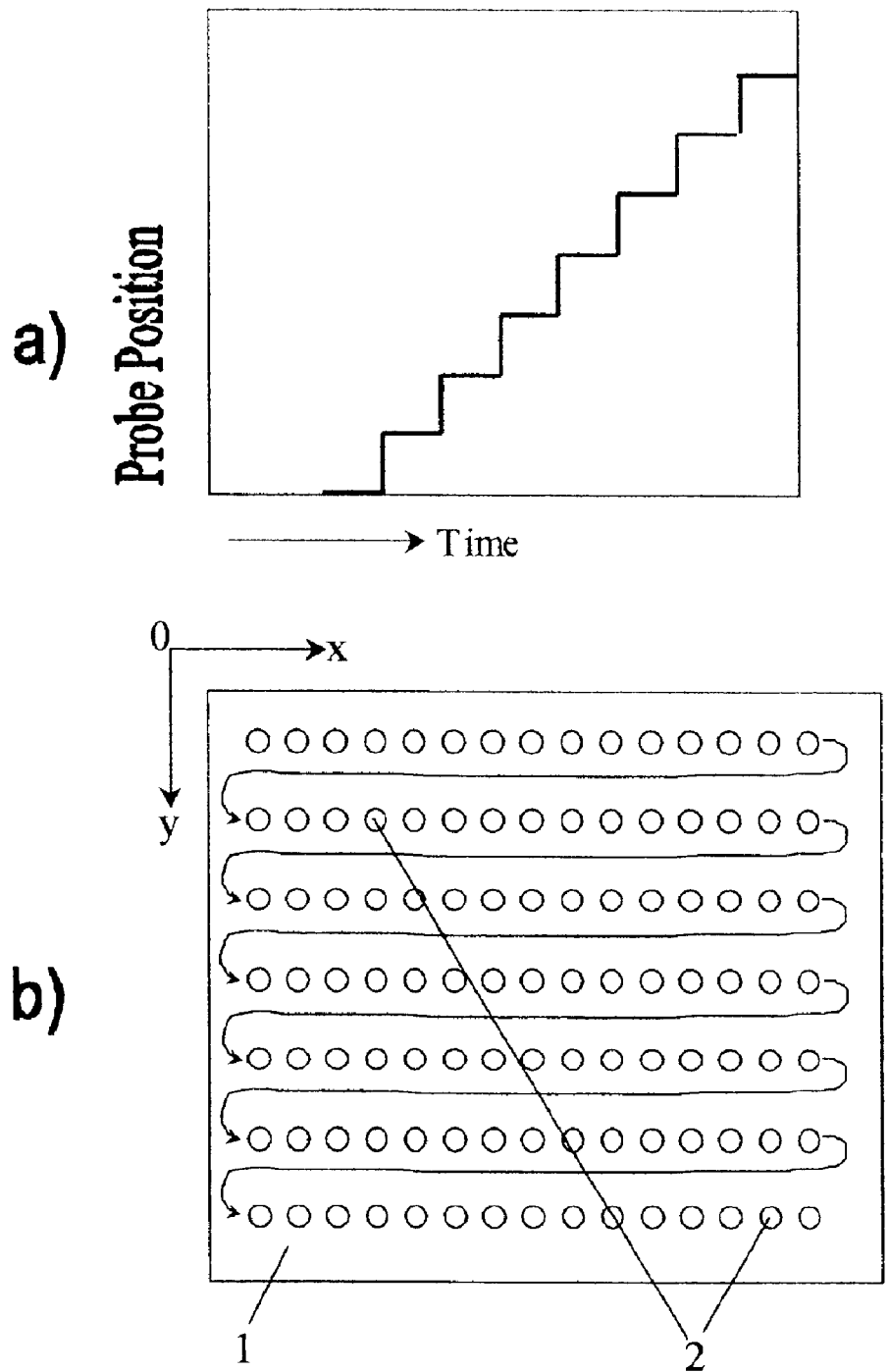
FIG. 3a is a view showing a movement of an electron beam over an object along the direction of a scan line X in a microscope with digital scanning with time plotted along the axis X and a coordinate of a point of falling of an electronic beam on a sample along an axis Y, so that an electron beam remains on each position for some time for reading a signal and then jumps to a new position.
FIG. 3b is a view showing a trajectory of movement of an electron beam over a field of view of the microscope with circles identifying pixels where the beam stops for a time of reading the signal S.
Figure 4:
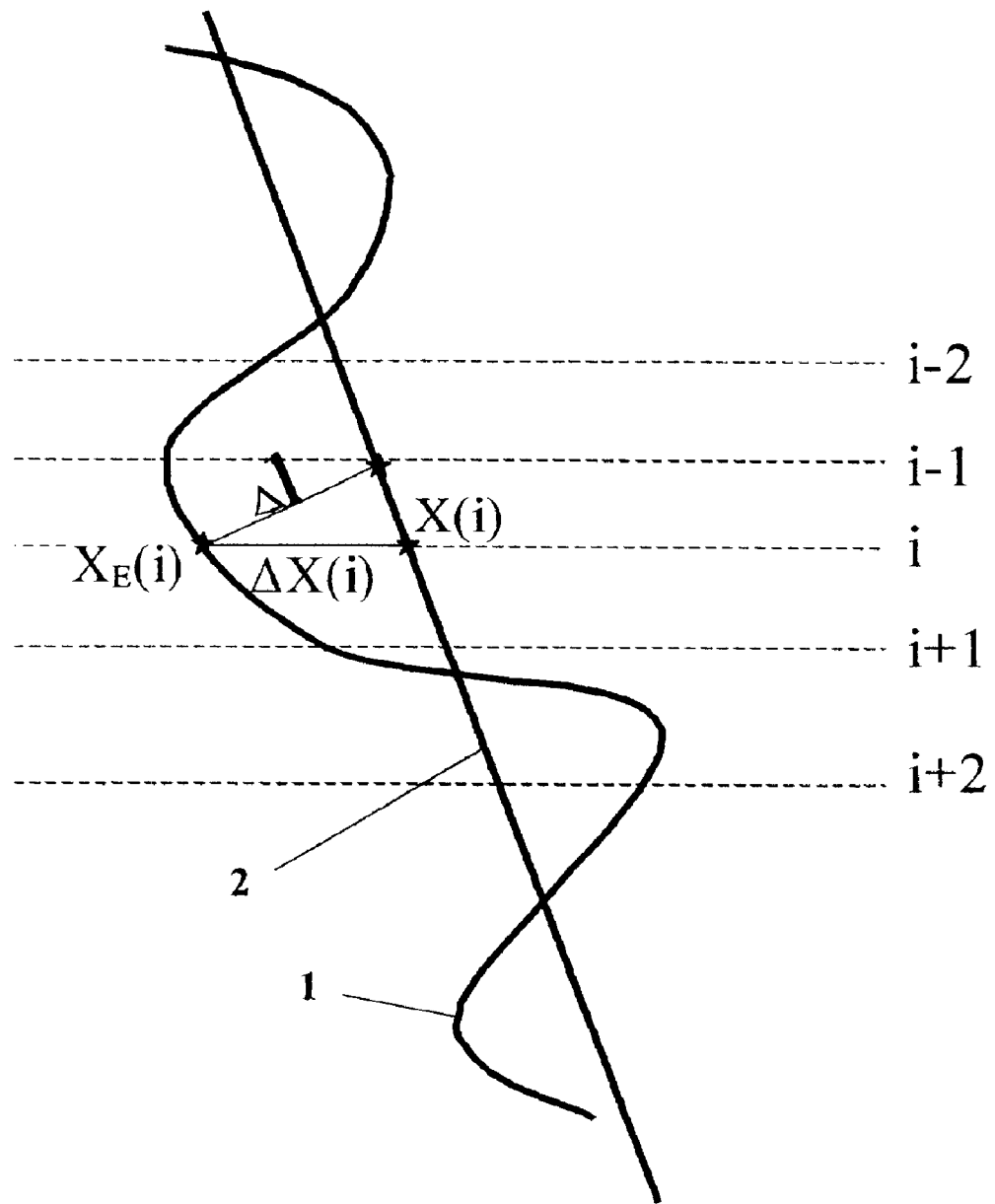
FIG. 4 is a view illustrating a geometry of an experiment and a ratio between the values Δx(i) and Δl(i)
Figure 5:
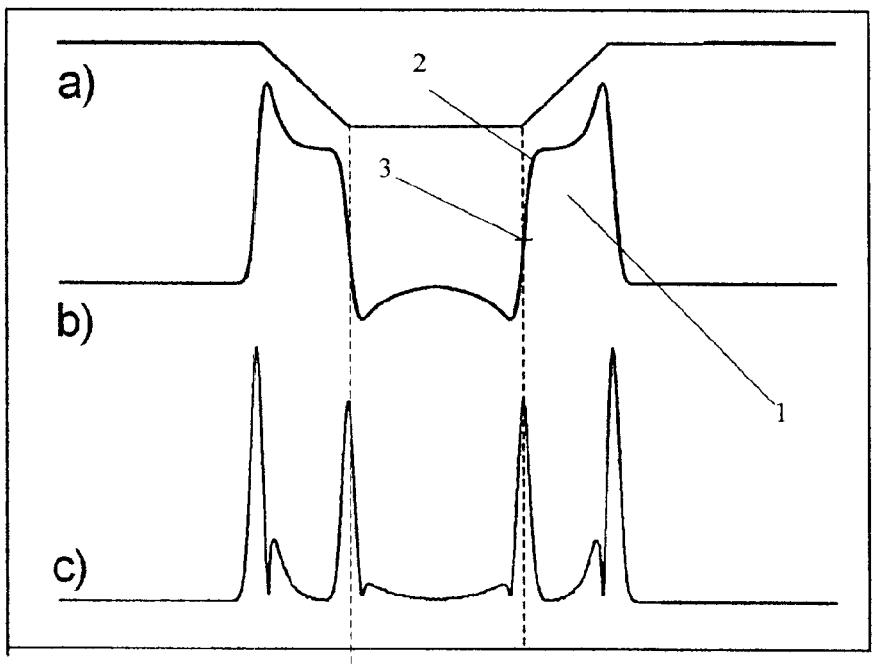
FIG. 5 is a view showing a geometry of a trapezoidal ledge, with its video signal and a derivative of the video signal, such that external maximums of the derivative coincide with a position of edges of the ledge along a lower line of its cross-section.

First of all, an object to be controlled is placed on a stage of a measuring scanning electron microscope and is positioned so that an edge to be investigated is located within the field of view of the microscope. The orientation is performed so that the edge of the object is not parallel to a direction of a scan line as shown in FIG. 2. Then a line-by-line scanning of the object is performed with an electron beam, and on each line values of a video signal S are measured, which correspond to each pixel along the direction X as shown in FIG. 3b, or in other words the dependency S from the number of pixel i or from the corresponding value of the coordinate X. This function S(i) or S(x) is used then for determination of a position of an edge in each line.

Several processes can be used for determination of the position of the edge on the function S(x), for example an algorithm "Threshold Crossing" or the "Linear Approximation Algorithm" etc. For the inventive method the selection of the algorithm is not critical, while of course the interpretation of the obtained numerical values of the line edge roughness depends on the selection of the algorithm. In particular, if the algorithm is used for edge localization along the lower line of a trapezoidal cross-section of the object, the calculated values will characterize the line edge roughness of the lower line of the object.

With the use of a corresponding algorithm of localization of the edge for a successive processing of all lines, a set of coordinates of the edge $X_E(i)$ for each line with a number (i) is obtained.

Then the set of the coordinates of the edge $X_E(i)$ is approximated by straight line having the following expression:

$$X(i)=A*i+B$$

with any method, for example with the use of a method of the least squares, and the values of constants A and B are determined in the equation.

In the next step the values X(i) from the equation are calculated for each scan line. For this purpose successively the numbers of the lines (i) are introduced into the right side of the equation, and with the use of the previously determined constants A and B a set of values X(i) is calculated.

The individual deviations Δx(i) are calculated separately for each scan line in accordance with the following formula:

$$\Delta x(i)=X_E(i)-X(i).$$

In the last step, the set of values Δx(i) is converted into a set of deviations Δl(i) in accordance with the formula:

$$\Delta l(i) = \frac{\Delta x(i)}{\sqrt{A^2+1}}$$

In accordance with another embodiment of the present invention, the following steps are performed.

An object to be controlled is placed on the stage of a measuring scanning electron microscope and is positioned so that the edge to be investigated is located in the field of vision of the microscope. The object is oriented so that the edge of the object is non parallel to the direction of the scan line as shown in FIG. 2. Then a line-by-line scanning in the microscope is performed with the electron beam, and on each line values of the video signal S are measured, which correspond to each pixel along the direction X as shown in FIG. 3b, or in other words the dependency S from each number of pixel i or from a corresponding value of the coordinate x. This function S(i) or S(x) is used then for determination of a position of an edge on each line.

In this embodiment a localization of the edge along the lower line of the trapezoidal cross-section is performed in accordance with a different sequence of steps. In particular, the determination of coordinates of the edge $X_E(i)$ on the function S(x) for each line i is performed as follows:

On the video signal S(x) two pronounced maximums are found which are located at the edges of the object, or so-called edge maximums. On each of the edge maximums working slopes are selected which are the slopes which adjoin the lower line of the trapezoidal cross-section, in accordance with the following rule: for objects formed as trapezoidal ledge these are exterior slopes, and for objects which are trapezoidal trenches these are inner slopes of the edge maximums. On the working slope of each left and right edge maximum reference points are found, which are the points where an absolute value of a derivative of the video signal has its maximum value. Abscissas of the reference points found in this way at the left and right edge maximums are considered to be coordinates of the left and right edges of the trapezoidal object on the lower line of its cross-section $X_E(i)$.

The next steps coincide with the steps of the method in accordance with the first embodiment. Then, the set of values $X_E(i)$ is approximated by a linear dependency in accordance with the following equation:

$$X(i)=A*i+B,$$

and parameters A and B are calculated for example, by a method of least squares which approximates the dependency $X_E$ from the number of line (i) in the best way.

An individual deviation)x(i) for each line in a position of the edge from a straight line, along the direction of a line development or the axis X is calculated as follows:

$$\Delta x(i)=X(i)-X_E(i),$$

where X(i) is a X coordinate of a point of intersection of the approximating straight line with the scan line having the number (i).

An individual for each scan line deviation Δl(i) of the position of the edge from a straight line in direction of a perpendicular to the approximating straight line is calculated in accordance with the formula:

$$\Delta l(i) = \frac{\Delta x(i)}{\sqrt{A^2+1}}$$

The obtained set of values $\Delta l(i)$ contains all necessary quantitative information about the line edge roughness. Average and standard deviations of the real edge from the straight (standard deviation STD) are calculated in a known way, for example:

$$STD = \sqrt{\frac{\sum (\Delta l(i))^2}{N}}$$

wherein N is a number of lines in which deviations of an edge from a straight line were determined. In the numerator, summing is performed for all N lines.

The sets of obtained values can be processed for example for finding maximum positive and negative deviations, finding a single numeral of an average or average square deviation, forming graphs of dependency $\Delta l(i)$ from the line number (i), analyzing a spectral oscillations $\Delta l(i)$ and calculating their space frequencies, etc.

It will be understood that each of the elements described above, or two or more together, may also find a useful application in other types of constructions differing from the types described above.

While the invention has been illustrated and described as embodied in method of measuring a non straight edge of micro objects in scanning microscopes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining a line edge roughness of a micro object, comprising the steps of orienting a micro object in a microscope so that an edge of an object to be analyzed is non parallel to a direction of a scan line which is an axis X of an image; line-by-line scanning of the object to be measured with electron beam and measuring of a dependency of a video signal S from a coordinate x along a scanning line as a function S(x) for each line; determining a coordinate of an edge $X_E$ on the function S(x) for each line to form a set of values $X_E(i)$ wherein (i) is a number of line; approximation of said set of values $X_E(i)$ with a linear function and calculation of parameters A and B in an equation:

$$X(i)=A*i+B,$$

which approximates the set of values $X_E$; calculation for each line an individual deviation $\Delta x(i)$ of a position of an edge from a straight line along a direction of the scan (axis X):

$$\Delta x(i)=X(i)-X_E(i);$$

wherein X(i) is an X coordinate of a line of intersection of an approximating line with a scan line having number (i);

calculating for each scan line an individual deviation $\Delta l(i)$ of a position of the edge from a straight line in a direction of a perpendicular line to the approximating straight line in accordance with the formula:

$$\Delta 1(i) = \frac{\Delta x(i)}{\sqrt{A^2+1}};$$

and using the thusly obtained set of values $\Delta l(i)$ for evaluation of a line edge roughness of the micro object.

2. A method as defined in claim 1; and further comprising processing including finding maximum positive and negative deviations among the values $\Delta l(i)$.

3. A method as defined in claim 1; and further comprising processing including characterizing a line edge roughness by a single numeral selected from the group consisting of an average deviation and an average square deviation.

4. A method as defined in claim 1; and further comprising processing includes forming graphs of a dependency of $\Delta l(i)$ from a line number (i).

5. A method as defined in claim 1; and further comprising processing including analyzing a spectral oscillation $\Delta l(i)$ and calculating of characteristic space frequencies of oscillations.

6. A method of determining a line edge roughness of a micro object along a lower line of a trapezoidal section, comprising the steps of orienting a micro object in a microscope so that an edge of an object to be analyzed is non parallel to a direction of a scan line which is an axis X of an image; line-by-line scanning of the object to be measured with electron beam and measuring a dependency of a video signal S from a coordinate x along a scanning line as a function S(x) for each line; determining a coordinate of an edge $X_E$ on the function S(x) for each line by finding on a video signal S(x) of two pronounced maximums located on edges of an object, selecting on each maximum working slopes which adjoin a lower line of a trapezoidal cross-section so that for objects with trapezoidal ledges these are exterior slopes and for objects in form of trenches these are interior slopes, on the working slope of each left and right maximum finding reference points as points where an absolute value of a derivative of the video signal has a maximum value and considering abscissas of such reference points as coordinates of an edge of the trapezoidal object along a lower line of its cross-section; approximating a set of values of $X_E(i)$ with a linear function and calculating parameters A and B with equation:

$$X(i)=A*i+B$$

which approximates the set of values $X_E$ calculating individually a deviation $\Delta x(i)$ of a position of the edge from a straight line for each line along the direction of the scan line (axis X)

$$\Delta x(i)=X(i)-X_E(i),$$

wherein X(i) is a coordinate of a point of intersection of the approximating straight line with the scan line having the number (i); calculating of an individual deviation $\Delta l(i)$ of position of edge from a straight line for each scan line in direction of a perpendicular to the approximating straight line in accordance with the formula $$\Delta l(i) = \frac{\Delta x(i)}{\sqrt{A^2 + 1}};$$

and using the thusly obtained set of values $\Delta l(i)$ for evaluation of a non-straight nature of the edge of the micro object.

7. A method as defined in claim 6; and further comprising processing including finding maximum positive and negative deviations among the values $\Delta l(i)$.

8. A method as defined in claim 6; and further comprising processing including characterizing a non straight nature of an edge by a single numeral selected from the group consisting of a mean deviation and a mean square deviation.

9. A method as defined in claim 6; and further comprising processing includes forming graphs of a dependency of $\Delta l(i)$ from a line number (i).

10. A method as defined in claim 6; and further comprising processing including analyzing a spectral oscillation $\Delta l(i)$ and calculating of characteristic space frequencies of oscillations.

* * * * *